3,277,071
PROCESS FOR POLYMERIZING ETHYLENE USING A PLATINUM OXIDE CATALYST
Sherwood M. Cotton, Harvey, Ill., assignor to Sinclair Research, Inc., New York, N.Y., a corporation of Delaware
No Drawing. Filed May 24, 1963, Ser. No. 282,866
5 Claims. (Cl. 260—94.9)

The present invention relates to the polymerization of ethylene to a normally solid polymer while employing as a catalyst for the polymerization, platinum oxide on a support selected from alumina and silica-alumina.

Polymers of ethylene are of great commercial importance. The normally solid, thermoplastic ethylene polymers melting above about 110° C. and having a molecular weight of from 1,000 up to several hundred thousand or more, and often showing the presence of a crystalline phase by X-ray diffraction, are known commercially as polyethylene, and are used in the form of films, filaments and articles made by injection and compression molding. They are also useful as an electrical insulator and as a fabricating material. Ethylene polymers of the nature of solid waxes also find uses in coatings and polishes.

The polymerization of olefins such as ethylene with certain solid, catalytic metal-containing catalysts is a well known process of the art. However, only a select few of these catalysts, for example, chromium oxide on an inert support, have been recognized as possessing any ability to polymerize ethylene to a solid polymer. In the majority of cases the resulting polymerization product is a liquid.

It has now been discovered that a catalyst consisting essentially of a catalytic amount of platinum oxide on a support selected from alumina and silica-alumina effects polymerization of ethylene to a solid polymer at a surprisingly fast rate and to high yield. These results are particularly surprising in that other members of the platinum group metals, in oxide form, and on the same supports fail to take the ethylene to a solid polymer. Moreover, platinum, in its free or elemental state on the same supports is a poor ethylene polymerization catalyst. In addition, as will be demonstrated below, the platinum oxide on other supports such as carbon and silica gel does not provide an active catalyst for the polymerization of ethylene to a solid polymer.

The silica-alumina base of the catalyst of the present invention may include at least about 50%, preferably about 75%, silica and a minor amount of alumina, for instance, about 1 to 48, preferably about 10 to 30 weight percent alumina based on the silica-alumina. Catalysts of very low or no silica content may also be utilized, for instance, the so-called Uvergel alumina catalysts which usually contain less than about 10 weight percent, say about 1 to 10%, silica. Suitable silica-aluminas include, for instance, those disclosed in U.S. Patent Nos. 2,384,505 and 2,542,190; clay catalysts and acidic solid oxide hydrocarbon cracking catalysts. The base can include minor amounts of other ingredients such as promoters, particularly acidic oxide promoters, for example metal oxides such as magnesia and boria, the total amount of such promoters generally not exceeding about 10 percent by weight, for instance about 0.1 to 5 weight percent. The preferred silica-alumina based catalysts are the synthetic gel type silica-aluminas, such as coprecipitated silica-alumina. Popular synthetic gel cracking catalysts generally contain about 10 to 30% alumina. Two such catalysts are "Aerocat" which contains about 13% $Al_2O_3$, and "High Alumina Nalcat" which contains about 25% $Al_2O_3$, with substantially the balance being silica. The catalysts may be only partially of synthetic material; e.g.

as may be made by precipitation of silica-alumina on an activated clay. One example of such catalysts contains about equal amounts of silica-alumina gel and clay.

Alumina bases from which the catalyst is prepared can be any of the known hydrates or an activated or calcined hydrogel. Hydrate such as the monohydrate, boehmite; the trihydrates, bayerite I, nordstrandite and gibbsite; or another hydrous alumina which appears to be amorphous and preferably the hydrates which contain a major portion or consist essentially of boehmite, may be used. Calcination converts these hydrates to an activated or gamma family type alumina, e.g. gamma, delta, eta, chi, etc., depending on the composition of the hydrate and choice of calcination conditions. The alumina hydrate can be prepared by any of the conventional methods, for example, an aqueous solution of aluminum chloride or other acidic aluminum salt can be reacted with aqueous ammonium hydroxide to precipitate an essentially boehmite or amorphous alumina hydrate. This material can be washed to remove chloride and ammonium ions.

The alumina can be activated or a hydrate in the form of dried or undried alumina hydrate or alumina hydrogel in gelatinous form dried, sufficiently to afford discrete particles; in any event, finely divided particles, e.g. passing about 100 or even 200 mesh (Tyler) for the most part, such as spray dried microspheres are preferred for our initial impregnation step. Such alumina supports are usually characterized by a large surface area ranging from about 60 to 600 or more square meters per gram, preferably greater than about 200 square meters per gram as determined by the BET method. The alumina may contain minor amounts of other ingredients such as silica or the metal oxides of the type noted above with reference to the silica-alumina support.

The platinum component can be added to the supports by known procedures, involving for instance, impregnation using a water-soluble compound of platinum or by precipitation of a platinum salt, followed, for example, by calcining at elevated temperatures, generally at least about 500° F. up to about 1600° F., to convert the platinum and obtain the metal oxide. Chloroplatinic acid is the preferred water-soluble platinum compound. When employing the impregnation procedure the resulting impregnated product can be dried, generally at a temperature within the range of about 170° F. to 400° F. for at least 6 hours and up to 24 hours or more with a stream of air circulated to carry off the water vapor. The dried catalyst mixture then may be formed by a tabletting or extruding operation. If the catalyst is to be in finely divided form, a grinding operation may follow drying. In the case of tabletting, it is customary to incorporate a die lubricant which advantageously is organic and can be burned out by oxidation in the calcination step.

The dried pellets are suitable for activation by high temperature treatment of calcination at a temperature between about 500° F. and about 1500° F., usually between about 700° F. and 1000° F., for instance, for a period of between about 2 and about 36 hours. It is generally preferred that the calcining operation be conducted in a manner minimizing contact time of the alumina-containing composite with water vapor at the high temperatures encountered. The product after drying generally contains a substantial amount of water which is driven off at temperatures above about 400° F. While the calcination or heat treatment will generally be conducted in air, it may be desirable to carry out the calcination initially in a blend of air and nitrogen. The alumina or silica-alumina support impregnated with the catalytically active component, is finally cooled to yield the finished product. The catalysts often contain about 0.2 to 5% or more weight percent of platinum oxide on the basis of the platinum metal.

The polymerization conditions may be adjusted to carry out the polymerization of ethylene in either the liquid or vapor phase. The temperature can vary over a wide range extending from about 70° F. or lower up to about 500° F. or more, preferably about 150 to about 300° F. As temperatures increase the molecular weight of the product tends to decrease. Suitable pressures are employed to maintain a desired concentration of ethylene at a given temperature and otherwise to govern phase relationships within the reaction zone. Polymerization can be conducted at pressures ranging from one atmosphere or even less up to the maximum pressure which the selected reaction equipment can withstand, for example 30,000 p.s.i.g. or more. A preferred pressure range is about 15 to 1000 p.s.i.g. Hydrocarbon or other suitable diluents known to those in the art may be used. Suitable hydrocarbon diluents are: pentane, hexane, heptane, cyclohexane, methylcyclohexane, benzene, toluene, xylene and the like. The solid product often has a molecular weight in the range of about 1000 to 1,000,000 or more, often about 2000 to 50,000. The amount of catalyst employed is sufficient to give the desired catalytic effect, for instance from a minor amount, say about 10%, of the ethylene to 2 to 10 or more times the ethylene in a batch system. In a continuous operation the space velocity may be, for instance, about 0.1 to 20 WHSV.

The catalyst of the present invention can be easily regenerated employing conventional procedures, for instance, by subjecting to an oxygen-containing gas at temperatures sufficient to burn off any heavy, insoluble polymer deposited on the catalyst during the polymerization. This oxygen-containing gas, e.g. an oxygen-nitrogen mixture, can contain about 0.01 weight percent to 5 weight percent oxygen but preferably contains about 0.5 to 1.5 weight percent oxygen and is usually introduced at a low rate such that the last temperature at the site of the combustion is below 1000° F.

The following examples are given to further illustrate the process of the present invention. In the examples the catalysts were prepared by impregnating the supports with a solution of either chloroplatinic acid, palladium chloride, rhodium chloride or iridium chloride in methylcyclohexane. The impregnated supports were dried at 300° F. and then calcined for about 2 hours in air at a temperature of about 900° F. The elemental platinum on alumina catalyst was prepared by reducing a platinum oxide on silica-alumina by heating in the presence of hydrogen. The catalysts were cooled and charged to the reaction vessel with no further treatment.

EXAMPLE I

The solid catalysts identified in Table I below were charged to a 100 ml. stainless steel pressure bomb. The bomb was evacuated of oxygen by purging it with an inert material such as nitrogen. Purified ethylene was pressured into the bomb and the bomb either heated or allowed to stand at room temperature. When the reaction was completed, the unreacted gases were discharged and the catalyst removed. The polymer product was then recovered from the catalyst extraction at 150° C. by using a solvent of mixed paraffins of 300–500° F. boiling range. The polymer precipitated from the solvent when the solvent was cooled and was recovered by filtration. The reaction runs, conditions and results are shown in Table I below.

*Table I.—Polymerization of olefins with platinum catalysts*

| Run No. | Description of Catalysts | | | | Charge | |
|---|---|---|---|---|---|---|
| | Platinum Catalyst | Percent Metal | Base | Type | Catalyst, grams | Olefin, grams |
| 1 | Platinum Oxide | 1 | Silica-Alumina | H | 66.5 | 20 |
| 2 | do | 2 | do | H | 70 | 18 |
| 3 | do | 3 | do | H | 73 | 17 |
| 4 | do | 0.6 | Alumina | E | 80 | 17 |
| 5 | do | 0.6 | do | E | 80 | 17 |
| 6 | do | 0.5 | Silica Gel | D | 72 | 13 |
| 7 | do | 2 | Alumina | E | 80 | 18 |
| 8 | do | 2 | Carbon | C | 51 | 18 |
| 9 | Platinum Chloride | 2 | do | C | 60 | 13 |
| 10 | Platinum Metal | 2 | Silica-Alumina | H | 68 | 16 |
| 11 | None | None | do | H | 69 | 20 |

| Run No. | Run Conditions | | | | | Products | |
|---|---|---|---|---|---|---|---|
| | Temperature | | Pressure | | Hours Run | | |
| | Initial | Maximum | Initial | Final | | Grams | Remarks |
| 1 | 85 | 142 | 930 | 0 | 2 | 20 | Wax MP 125° C. |
| 2 | 80 | 176 | 850 | 100 | 0.5 | 17 | Wax MP 126° C. |
| 3 | 80 | 156 | 850 | 50 | 1.5 | 17 | Wax MP 125° C. |
| 4 | 80 | 80 | 830 | 440 | 48 | 8 | Wax MP 123° C. |
| 5 | *258 | *258 | 1,550 | 0 | 24 | 17 | Wax MP 120° C. |
| 6 | *230 | *245 | 980 | 980 | 17 | 0 | No reaction. |
| 7 | 80 | 130 | 850 | 100 | 2 | 16 | Wax MP 115° C.; butenes in gas. |
| 8 | *300 | *320 | 1,500 | 1,780 | 6 | 0 | No reaction. |
| 9 | 76 | 76 | 700 | 700 | 500 | 0 | Do. |
| 10 | 80 | 80 | 480 | 270 | 56 | 10 | Very slow reaction. |
| 11 | 80 | 130 | 930 | 775 | 22.5 | 7 | Do. |

C = Coconut charcoal mesh 4 to 14.
D = Commercial grade silica gel 28–200 mesh.
E = An eta-alumina extruded into 1/16" pellets having a surface area of about 500 sq. meters/grams.
H = A commercial silica-alumina cracking catalyst in 1/8" pellet form having a surface area of 254.2 meters/gm., a density of .622 gms./cc. and analyzing 87.2% cerium-X dioxide and 11.7% alumina.
MP = Melt Point.
* = Heated Runs.

The data of Table I illustrate that platinum oxide in combination with a silica-alumina or alumina base is an excellent catalyst for the polymerization of ethylene to a solid polymer. The data demonstrate further that a catalyst of platinum oxide on silica-alumina as the support provides a highly superior polymerization catalyst for this purpose. The best indication of the most active catalyst is the last temperature obtained in the polymerization run. Since in most runs no heat was added (except Runs 5, 6 and 8) the temperature rise was due to the heat liberated in the polymerization. Therefore, the faster the rate of polymerization the greater will be the temperature.

A comparison of Runs 1, 2 and 13 shows that elemental platinum metal on silica-alumina is inactive as an ethylene polymerization catalyst. In addition, Run 8, wherein platinum oxide on a carbon base was employed as a catalyst, illustrates the importance of an alumina or silica-alumina support in making an active platinum oxide catalyst for the polymerization of ethylene to a solid polymer.

EXAMPLE II

Employing the general procedure of Example I, various platinum group metal oxide on alumina or silica-alumina catalyst were used in the polymerization of ethylene. The catalyst, polymerization conditions and results are shown in Table II below.

tially of catalytic amounts of platinum oxide on a support selected from the group consisting of alumina and silica-alumina.

2. The process of claim 1 wherein the support selected is silica-alumina containing at least 50% by weight of silica and about 10 to 48% by weight of alumina.

3. The process of claim 2 wherein the silica-alumina contains at least 75% silica and about 10 to 30% by weight of alumina.

4. The process of claim 1 wherein the platinum oxide is present on the support in amounts of about 0.2 to 5% by weight on a platinum metal basis.

5. A process for the polymerization of ethylene to a solid polymer which comprises contacting ethylene at a temperature of about 70° F. up to about 500° F. and a pressure of up to 30,000 p.s.i.g. with a catalyst consisting essentially of catalytic amounts of platinum oxide on a support selected from the group consisting of alumina and silica-alumina.

*Table II.—Polymerization of ethylene with Group VIII catalysts*

| Run | Catalyst | Percent Metal | Base | Type | Catalyst, Grams | Ethylene | Temp., °F. | Pressure, p.s.i.g. | Hours | Products |
|---|---|---|---|---|---|---|---|---|---|---|
| 1 | Iridium Oxide | .6 | Alumina | E | 77 | 19 | 118 | 850 | 24 | No solids, butenes, wax. |
| 2 | ---do--- | 2 | ---do--- | E | 57 | 14 | 72 | 830 | 24 | No solid wax. Butenes. |
| 3 | ---do--- | 1 | Silica Alumina | H | 65 | 12 | 85 | 700 | 6 | Do. |
| 4 | Rhodium Oxide | .75 | ---do--- | H | 67 | 17 | 150 | 650 | .5 | Gasoline range products $C_6$–$C_{10}$. |
| 5 | Palladium Oxide | .11 | ---do--- | H | 64 | 20 | 250 | 700 | .25 | No solid wax. |

The data of Table II demonstrate that the other Group VIII platinum group metal oxides on alumina or silica-alumina did not polymerize ethylene to a solid polymer.

I claim:

1. A process for the polymerization of ethylene to a solid polymer which comprises contacting ethylene under polymerization conditions with a catalyst consisting essen-

References Cited by the Examiner

UNITED STATES PATENTS 2,825,721   3/1958   Hogen et al. -------- 260—94.9

JOSEPH L. SCHOFER, *Primary Examiner.*

F. L. DENSON, *Assistant Examiner.*